US010056656B2

(12) United States Patent
Song

(10) Patent No.: US 10,056,656 B2
(45) Date of Patent: Aug. 21, 2018

(54) MANUFACTURING METHOD OF HIGH PURITY LITHIUM PHOSPHATE FROM THE WASTE LIQUID OF THE EXHAUSTED LITHIUM-ION BATTERY

(71) Applicant: KANGWON NATIONAL UNIVERSITY University-Industry Cooperation Foundation, Gangwon-do (KR)

(72) Inventor: Young Jun Song, Gangwon-do (KR)

(73) Assignee: KANGWON NATIONAL UNIVERSITY University-Industry Cooperation Foundation, Gangwon-do (KR)

( * ) Notice: Subject to any disclaimer, the term of this patent is extended or adjusted under 35 U.S.C. 154(b) by 180 days.

(21) Appl. No.: 15/240,792

(22) Filed: Aug. 18, 2016

(65) Prior Publication Data

US 2017/0084965 A1 Mar. 23, 2017

(30) Foreign Application Priority Data

Sep. 22, 2015 (KR) .................... 10-2015-0134072

(51) Int. Cl.
*H01M 10/54* (2006.01)
*C01B 25/30* (2006.01)
(Continued)

(52) U.S. Cl.
CPC ............ *H01M 10/54* (2013.01); *B01D 15/10* (2013.01); *C01B 25/30* (2013.01); *C22B 7/006* (2013.01);
(Continued)

(58) Field of Classification Search
CPC ................. H01M 10/54; C01B 25/30
See application file for complete search history.

(56) References Cited

U.S. PATENT DOCUMENTS 3,044,850 A * 7/1962 Denton ............... B01J 27/1806
423/313
3,325,245 A * 6/1967 Rowton ............... B01J 27/1806
423/312
(Continued)

FOREIGN PATENT DOCUMENTS

KR 10-1321070 10/2013 ............ C01B 25/30

*Primary Examiner* — Wayne A Langel
(74) *Attorney, Agent, or Firm* — Harness, Dickey & Pierce, P.L.C.

(57) ABSTRACT

Provided is a method of manufacturing a high-purity lithium phosphate by utilizing a lithium waste liquid of a wasted battery. Lithium phosphate is manufactured and refined by using a minimized amount of sodium hydroxide and by using phosphate, lithium hydroxide, and an optimized pH condition, so that it is possible to manufacture high-purity lithium phosphate from which fine impurities which cannot be removed by cleaning are effective removed. A waste water treatment process of processing waste water as to be immediately discharged is integrated, so that the method is very efficient and environment-friendly. Therefore, since the high-purity lithium phosphate can be manufactured by utilizing a lithium waste liquid discarded in a wasted battery recycling process, the method has an effect in that the method is applied to a wasted battery recycling industry to prevent environmental pollution and facilitate recycling resources.

10 Claims, 3 Drawing Sheets

(51) Int. Cl.
*B01D 15/10* (2006.01)
*C22B 26/12* (2006.01)
*C22B 7/00* (2006.01)
*H01M 10/0525* (2010.01)
*C02F 101/10* (2006.01)
*C02F 103/34* (2006.01)
*C02F 1/52* (2006.01)
*C02F 11/14* (2006.01)
*H01M 4/58* (2010.01)

(52) U.S. Cl.
CPC ............ *C22B 26/12* (2013.01); *C01B 25/301* (2013.01); *C01B 25/303* (2013.01); *C02F 1/5236* (2013.01); *C02F 11/14* (2013.01); *C02F 2101/105* (2013.01); *C02F 2103/34* (2013.01); *H01M 4/5825* (2013.01); *H01M 10/0525* (2013.01); *Y02P 10/234* (2015.11); *Y02W 30/84* (2015.05)

(56) References Cited

U.S. PATENT DOCUMENTS

| | | | |
|---|---|---|---|
| 3,758,612 A * | 9/1973 | Maurin | B01J 27/1806 585/611 |
| 4,720,598 A * | 1/1988 | Scholte | B01J 27/1806 423/312 |
| 2004/0018135 A1* | 1/2004 | Adamson | C01B 25/30 423/313 |
| 2013/0129586 A1* | 5/2013 | Chon | C01B 25/30 423/179.5 |
| 2013/0146476 A1* | 6/2013 | Chon | C01B 25/30 205/770 |
| 2014/0377154 A1* | 12/2014 | Ishida | C22B 7/006 423/179.5 |
| 2015/0013499 A1* | 1/2015 | Asano | C22B 3/0005 75/739 |

* cited by examiner

US 10,056,656 B2

MANUFACTURING METHOD OF HIGH PURITY LITHIUM PHOSPHATE FROM THE WASTE LIQUID OF THE EXHAUSTED LITHIUM-ION BATTERY

CROSS-REFERENCE TO RELATED PATENT APPLICATION

This application claims the benefit of Korean Patent Application No. 10-2015-0134072, filed on Sep. 22, 2015 in the Korean Intellectual Property Office, the disclosure of which is incorporated herein in its entirety by reference.

FIELD

The present disclosure relates to a method of manufacturing high-purity lithium phosphate by using a lithium waste liquid of a wasted battery.

BACKGROUND

Koreas is a leading nation in production of lithium secondary batteries. The capacity of production of cathode materials for secondary batteries is 40% of the capacities of the entire world. The Import volume of lithium carbonate for the cathode materials is about 15,000 tons per year. A process of recycling the wasted battery is classified into a dry process and a wet process. In the dry process of recycling the wasted battery, wasted lithium secondary battery is inserted into a high-temperature furnace to recover organic metals. The dry process is relatively simple, but there are disadvantages of high early-stage investment, a low recovery rate of organic metals, and a high cost for gas treatment. In the wet process of recycling the wasted battery, the wasted battery is dissolved in sulfuric acid, and organic metals are extracted by using a solvent. The wet process has advantages of low early-stage investment, a high recovery rate of organic metals, and a high purity of organic metals. However, the wet process has a disadvantage of a high cost of treatment of waste liquid used for solvent extraction. In Korea, 20,000 tons/year of wasted batteries is estimated to be wasted. In the solvent extraction process for recovering cobalt and nickel from the wasted batteries, a large amount of manganese sulfate waste liquid and lithium waste liquid are generated. Particularly, with respect to the lithium waste liquid, the generated amount is very large, and the concentration of lithium contained in the lithium waste liquid is so high as about 3000 ppm. Therefore, a technique of recovering the lithium has been urgently demanded. However, in the related art, in a lithium recovery process using adsorption, desorption, concentration, and solvent extraction, or evaporation concentration and solvent extraction, the process cost is as high as 50,000,000 wons/ton, and thus, the process of the related art is hard to employ. As a lithium recovery method, a method using lithium phosphate is mostly used. Since the lithium phosphate is a refractory material, there is an advantage in that, if a phosphoric acid supplying material is simply added in a lithium recovering process, lithium can be recovered in a form of lithium phosphate precipitate. However, since the lithium waste liquid of the wasted batteries contains sodium, sulfuric acid, and organic materials besides the lithium. Therefore, strict precipitation conditions are needed. In addition, a large amount of sodium or sulfuric acid may be contained according to the form of the lithium phosphate crystals. For these reason, the lithium recovery method using lithium phosphate has a difficulty in manufacturing high-purity lithium phosphate.

Patent Documents and reference documents disclosed in the specification are incorporated into the specification by reference to the same degree that the documents are individually and clearly specified.

Patent Document 1: Korean Patent No. 10-1321070 (Date of Registration: Oct. 16, 2013)

SUMMARY

The invention is to provide an economical, environment-friendly method of manufacturing high-purity lithium phosphate from a lithium waste liquid by manufacturing and refining the lithium phosphate by using a minimized amount of sodium hydroxide and by using phosphate and lithium hydroxide.

Other objects and technical features will be disclosed more specifically by the detailed description, the claims, and the drawings.

According to an aspect of the invention, there is provided a method of manufacturing high-purity lithium phosphate by using a lithium waste liquid of a wasted battery, comprising steps of:

(a) allowing the lithium waste liquid to pass through active carbon to remove organic materials;

(b) adding a soluble phosphate including $Na_3PO_4$, $Na_2HPO_4$, $NaH_2PO_4$, $K_3PO_4$, or $H_3PO_4$ or an aqueous solution of the soluble phosphate with 0.9 to 1.2 molar equivalents with respect to a concentration of lithium existing in the lithium waste liquid to the lithium waste liquid from which the organic materials are removed and adding an aqueous alkali including NaOH or KOH or an aqueous solution of the alkali to produce a mixed solution of sodium phosphate and lithium waste liquid of which pH is in a range of 13 to 13.9;

(c) reacting the mixed solution of phosphate and lithium waste liquid in a temperature range of 50 to 100° C. for 30 to 120 minutes, and after that, performing first solid liquid separation to produce lithium phosphate which is precipitated in a solid state;

(d) adding water of which weight is 5 to 20 times the weight of the lithium phosphate to the produced lithium phosphate and adding an acid including $H_3PO_4$, $H_2CO_3$, $H_2SO_4$, $HNO_3$, or HCl and an aqueous solution of the acid to produce a lithium phosphate aged solution of which pH is in a range of 7 to 11 and stirring the lithium phosphate aged solution at the room temperature for 30 minutes or more to age the lithium phosphate;

(e) adding an aqueous solution of lithium hydroxide with a molar equivalent of the added amount of the acid to the stirred lithium phosphate aged solution to produce a lithium phosphate precipitated solution of which pH is in a range of 11.5 to 13.5 and stirring the lithium phosphate precipitated solution in a temperature range of 50 to 100° C. for 20 minutes or more to precipitate high-purity lithium phosphate; and (f) cleaning and drying the separated high-purity lithium phosphate.

In the method of manufacturing the high-purity lithium phosphate, while the lithium phosphate is precipitated, the filtrated liquid (waste water) containing highly-concentrated phosphoric acid is produced.

According to the embodiment, the waste water treatment process includes the following steps of:

(g) adding calcium hydroxide ($Ca(OH)_2$) having a concentration of 1 to 1.5 wt % in a 10% slurry state to the filtrated liquid obtained through the first solid liquid separation of claim 1 to stirring for 20 to 40 minutes;

(h) adding carbon dioxide ($CO_2$) to the stirred filtrated liquid to adjust the pH to be in a range of 5.5 to 6.5;

(i) adding 10% aluminum sulfate ($Al_2(SO_4)_3$) solution having a concentration of 0.01 to 0.02 wt % to the pH-adjusted filtrated liquid and stirring for 20 to 40 minute; and (j) performing third solid liquid separation on the stirred filtrated liquid to separate sludge containing a refractory phosphate and the filtrated liquid.

The invention relates to a method of manufacturing a high-purity lithium phosphate by utilizing a lithium waste liquid of a wasted battery. In the invention, lithium phosphate is manufactured and refined by using a minimized amount of sodium hydroxide and by using phosphate, lithium hydroxide, and an optimized pH condition, so that it is possible to manufacture high-purity lithium phosphate from which fine impurities which cannot be removed by cleaning are effective removed. In addition, a waste water treatment process of processing waste water as to be immediately discharged is integrated into the method, so that the method is very efficient and environment-friendly. Therefore, in the invention, since the high-purity lithium phosphate can be manufactured by utilizing a lithium waste liquid discarded in a wasted battery recycling process, the invention has an effect in that the method is applied to a wasted battery recycling industry to prevent environmental pollution and facilitate recycling resources.

DETAILED DESCRIPTION

Figure 1:
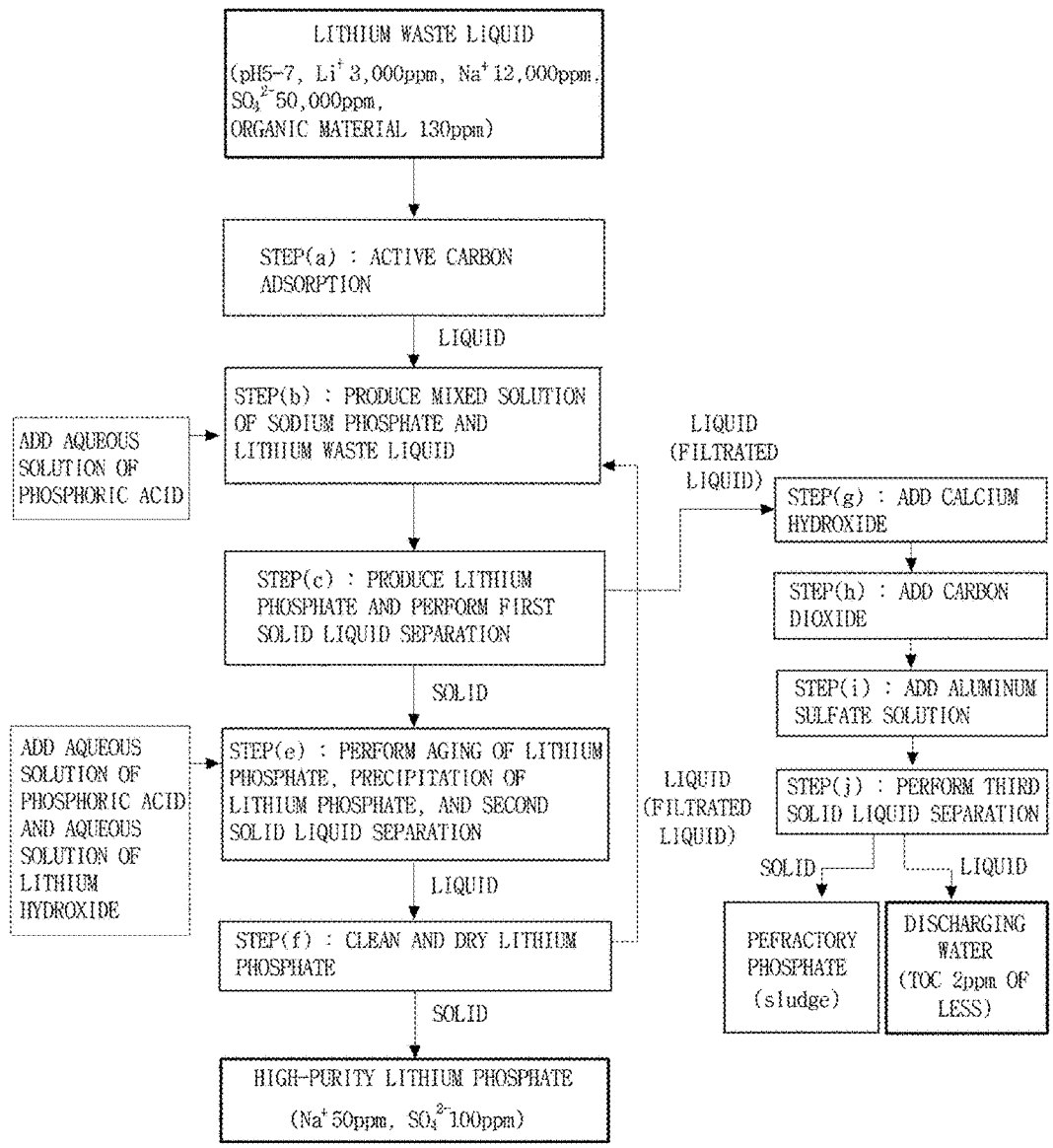
FIG. 1 is a diagram illustrating processes of manufacturing high-purity lithium phosphate by utilizing a lithium waste liquid.

In the invention, a term "lithium waste liquid of a wasted battery" denotes waste water containing lithium generated in a solvent extraction process for recovering cobalt and nickel from cathode materials of the wasted battery. Hereinafter, a method of manufacturing a high-purity lithium phosphate by utilizing a lithium waste liquid of a wasted battery will be described in detail.

[Step of Removing Organic Materials]

According to the embodiment, the pH of the lithium waste liquid is in a range of 5 to 7, and the lithium waste liquid contains 300 to 3,0000 mg/kg of lithium ions, 10,000 to 50,000 mg/kg of sodium ions, and 10,000 to 100,000 mg/kg of sulfate ions.

According to another specific embodiment, the lithium waste liquid is allowed to pass through active carbon to remove organic materials. The active carbon has an effect of adsorbing the organic materials to remove the organic materials. Any active carbon capable of reducing a total amount (TOC, Total Organic Carbon) of the organic materials existing in the lithium waste liquid down to 20 mg/kg or less may be used without limitation to the type or the adsorption method thereof.

[Step of Producing Lithium Phosphate]

The lithium waste liquid from which the organic materials are removed is added with aqueous solution of soluble phosphate and aqueous solution of aqueous alkali to produce a mixed solution of phosphate and lithium waste liquid.

According to the embodiment, the lithium waste liquid from which the organic materials are removed is added with a soluble phosphate including $Na_3PO_4$, $Na_2HPO_4$, $NaH_2PO_4$, $K_3PO_4$, or $H_3PO_4$ or an aqueous solution of the soluble phosphate with 0.9 to 1.2 molar equivalents with respect to a concentration of lithium existing in the lithium waste liquid. Preferably, the lithium waste liquid from which the organic materials are removed is added with a soluble phosphate including $Na_3PO_4$, $Na_2HPO_4$, $NaH_2PO_4$, $K_3PO_4$, or $H_3PO_4$ or an aqueous solution of the soluble phosphate with 1.0 to 1.1 molar equivalents with respect to a concentration of lithium existing in the lithium waste liquid.

According to another embodiment, the solubility of the soluble phosphate to water is 1 g/l or more.

According to another embodiment of the invention, in the aqueous solution of the soluble phosphate, the concentration of the soluble phosphate is in a range of 5 to 30 wt %, and the pH thereof is in range of 13 to 13.9. Preferably, in the aqueous solution of the soluble phosphate, the concentration of the soluble phosphate is in a range of 7 to 15 wt %, and the pH thereof is in a range of 13.3 to 13.7.

The soluble phosphate is added to the lithium waste liquid and is used as a material for supplying the phosphoric acid. If the soluble phosphate with 1 molar equivalent of lithium or less is supplied, the amount of unreacted lithium is increased, and thus, a ratio of precipitate of the lithium phosphate is decreased. Therefore, it is preferable that the concentration of the phosphoric acid supplied through the soluble phosphate is equal to or higher than 1 molar equivalent of lithium existing in the lithium waste liquid. However, since excessive supplying of the phosphoric acid leads to high cost in the waste water treatment process, an appropriate amount of the phosphoric acid needs to be used by taking into consideration the precipitation ratio of the lithium phosphate and the cost of the phosphoric acid treatment.

According to the embodiment, the lithium waste liquid added with the phosphate is added with aqueous alkali including NaOH or KOH or an aqueous solution of the alkali to produce a mixed solution of sodium phosphate and lithium waste liquid of which pH is in a range of 13 to 13.9. Preferably, the lithium waste liquid added with the phosphate is added with aqueous alkali including NaOH or KOH or an aqueous solution of the alkali to produce a mixed solution of sodium phosphate and lithium waste liquid of which pH is in a range 13.3 to 13.9.

The amount of $HPO_4^{2-}$ existing in the mixed solution of the sodium phosphate and the lithium waste liquid may determine the solubility of the lithium phosphate. If the fraction of the $HPO_4^{2-}$ is heightened, the solubility of the lithium phosphate is increased. Since the aqueous alkali or the aqueous solution of the alkali supplies hydroxyl group to the mixed solution of sodium phosphate and lithium waste liquid to suppress generation of $H_2PO_4^-$, $HPO_4^{2-}$, and $HCO_3^-$, the aqueous alkali or the aqueous solution of the alkali has an effect of decreasing the solubility of the lithium phosphate. Therefore, a predetermined concentration or more of the hydroxyl group supplied by the aqueous solution of the alkali needs to exist in the mixed solution of sodium phosphate and lithium waste liquid in order to effectively precipitate the lithium phosphate. In addition, the fraction of the $HPO_4^{2-}$ is very sensitive to the pH thereof. The fraction of the $HPO_4^{2-}$ is 100% at pH 10, 50% at pH 12.67, and 0% at pH 14. Therefore, preferably, the pH of the mixed solution of sodium phosphate and lithium waste liquid is maintained 13 or more in order to effectively precipitate the lithium phosphate. According to a specific embodiment of the invention, if the reaction is performed while the pH of the mixed solution of sodium phosphate and lithium waste liquid is maintained 13.5, the manufacturing yield of the lithium phosphate is 98%.

According to another specific embodiment, in the mixed solution of phosphate and lithium waste liquid, the concentration of the phosphate ($PO_4^{3-}$) is 0.9 to 1.2 molar equivalents of lithium concentration, and the concentration of the hydroxyl group is 0.01 to 1 N. Preferably, in the mixed solution of sodium phosphate and lithium waste liquid, the concentration of the phosphate ($PO_4^{3-}$) is 1.1 molar equivalents of lithium concentration, and the concentration of the hydroxyl group is 0.25 N. If the mixed solution of phosphate and lithium waste liquid is reacted at a predetermined temperature for a predetermined time, the solid-state lithium phosphate is precipitated. The characteristics of the precipitated lithium phosphate crystal are determined according to pH, temperature, and time of the reaction solution.

According to the embodiment, the mixed solution of phosphate and lithium waste liquid is reacted in a temperature range of 50 to 100° C. for 30 to 120 minutes. Preferably, the mixed solution of phosphate and lithium waste liquid is reacted in a temperature range of 70 to 95° C. for 45 to 90 minutes. Since the reaction temperature of the mixed solution of phosphate and lithium waste liquid determines the characteristics of the lithium phosphate crystal, the yield and purity of the lithium phosphate can also be determined. If the reaction temperature in the reaction is high, the crystal growing speed of the lithium phosphate crystal is increased, and thus, a large-sized crystal may be generated. On the contrary, if the reaction temperature is low, the crystal growing speed of the lithium phosphate crystal is decreased, and thus, a fine-sized crystal may be generated. The size of the lithium phosphate crystal influences on the yield of precipitate of the lithium phosphate by using the hydroxyl group. As the size of the lithium phosphate crystal is decreased, the yield of precipitate of the lithium phosphate according to the hydroxyl group is decreased. Therefore, the yield of the lithium phosphate generated at a low reaction temperature is lower than that of the lithium phosphate generated at a high reaction temperature. The solubility of the lithium phosphate is sensitive to the concentration of the dissolved carbonic acid ($HCO_3^-$ or $H_2CO_3$). Since the solubility of the lithium phosphate is inversely proportional to the concentration of the dissolved carbonic acid, if the amount of the dissolved carbonic acid is large, the yield of precipitate of the lithium phosphate is decreased. The solubility of the dissolved carbonic acid in water is inversely proportional to the temperature. Therefore, if precipitation of the lithium phosphate by using the hydroxyl group is performed at a high reaction temperature, it is possible to obtain an effect that a decrease in yield of precipitate of the lithium phosphate caused by the dissolved carbonic acid is prevented.

A change in characteristics of the lithium phosphate crystal according to the reaction temperature is an important factor of determining the purity of the lithium phosphate. The reaction temperature determines the characteristics of the lithium phosphate crystal. If the reaction temperature is high, the crystal growing speed is increased, a large-sized lithium phosphate crystal may be generated. On the contrary, if the reaction temperature is low, the crystal growing speed is decreased, so that a fine-sized lithium phosphate crystal may be generated. In the case where the size of the lithium phosphate crystal is fine, the fine-sized lithium phosphate crystal may be generated in a form of a primary particle, a secondary particle obtained from agglomeration of the primary particles, and a tertiary particle obtained from agglomeration of the secondary particles. As the particle size of the lithium phosphate crystal is increased, the lithium phosphate crystal is mainly generated in a form of the primary particle. If the form of the lithium phosphate crystal is complicated as the secondary or tertiary particle, the number of voids between the agglomerated particles is increased, and the surface thereof is complicated. As a result, fine-sized particles such as sodium ions or sulfate ions are easily adsorbed. Since the fine-sized particles adsorbed to the lithium phosphate crystals are hard to remove, the adsorption of the fine-sized particles become a cause of deterioration in the purity of the lithium phosphate. Therefore, if the lithium phosphate crystal has a large size and is configured only in a form of primary particle, the adsorption of the fine-sized particles is prevented, so that it is possible to manufacture high-purity lithium phosphate. In addition, if the reaction temperature is increased, rearrangement of active ions occurs in the lithium phosphate crystal forming process, and thus, the increase in the reaction temperature leads to an effect of extracting impurity components trapped in the phosphate crystal outside the crystal. Therefore, the lithium phosphate generated at a high reaction temperature has a high purity.

According to the embodiment, the mixed solution of sodium phosphate and lithium waste liquid is reacted in a temperature range of 50 to 100° C. for 30 to 120 minutes, and first solid liquid separation is performed to acquire the solid-state precipitate of the lithium phosphate. Preferably, the mixed solution of sodium phosphate and lithium waste liquid is reacted in a temperature range of 70 to 95° C. for 30 to 60 minutes, and the first solid liquid separation is performed to acquire the solid-state precipitate of the lithium phosphate. As described above, the lithium phosphate generated in the above-described reaction is precipitated by the hydroxyl group contained in the mixed solution of sodium phosphate and lithium waste liquid, and the solid liquid separation is performed to acquire the lithium phosphate.

According to specific embodiments, the solid liquid separation is performed while the reaction temperature of the mixed solution of sodium phosphate and lithium waste liquid is maintained to be in a range of 50 to 100° C.

Preferably, the solid liquid separation is performed while the reaction temperature of the mixed solution of sodium phosphate and lithium waste liquid is maintained to be in a range of 70 to 95° C. If the solid liquid separation is performed while maintaining the aforementioned reaction temperature, the concentration of the dissolved carbonic acid existing in the mixed solution of sodium phosphate and lithium waste liquid is maintained in a low state, it is possible to obtain an effect in that the yield of precipitate of the lithium phosphate is not decreased.

[Step of Refining Lithium Phosphate]

According to a specific embodiment of the invention, a lithium waste liquid contains 24, 400 mg/kg of sodium ions and 48, 900 mg/kg of sulfate ions. Since the particle sizes of the sodium and sulfate ions are fine, the sodium and sulfate ions are trapped in the lithium phosphate crystal or adsorbed to voids between the lithium phosphate crystals or surfaces of the lithium phosphate crystals. The sodium acid and the sulfuric acid are hard to remove by using a general cleaning process due to the fine structure of the lithium phosphate crystal. In the invention, in order to solve the deterioration in purity of the lithium phosphate caused from the existence of the sodium ions and the sulfate ions, an aging step and a precipitation step are performed.

In the aging step, the precipitated lithium phosphate is added with an acid or an aqueous solution of the acid to produce a lithium phosphate aged solution of which pH is in a range of 7 to 11, and stirring is performed. If the produced lithium phosphate is stirred in the lithium phosphate aged solution as an environment where the solubility is increased, it is possible to obtain an effect in that the rearrangement of the lithium phosphate crystals is facilitated. If the lithium phosphate crystals are rearranged in the lithium phosphate aged solution, the sodium and sulfate ions trapped in the lithium phosphate crystals can be extracted. It is preferable that the pH of the lithium phosphate aged solution is 10. If the pH is 10 or more, the solubility of the lithium phosphate is low, and the time taken for the aging is increased. On the other hand, if the pH is 10 or less or is further lowered pH of acidity, the solubility is advantageously increased, but the consumption of chemicals for re-precipitation is also increased, and thus, there is a problem in that the process cost is increased.

According to the embodiment, the added acid may be $H_3PO_4$, $H_2CO_3$, $H_2SO_4$, $HNO_3$, or HCl. However, any acid which can adjust the pH of the solution to be in a range of 7 to 11 can be used without limitation.

According to another specific embodiment, water of which weight is 5 to 20 times the weight of the lithium phosphate is added to the lithium phosphate, an acid including $H_3PO_4$, $H_2CO_3$, $H_2SO_4$, $HNO_3$, or HCl or an aqueous solution of the acid is added, so that a lithium phosphate aged solution of which pH is in a range of 7 to 11 is produced. The lithium phosphate aged solution is stirred at the room temperature for 30 minutes or more to age the lithium phosphate. Preferably, water of which weight is 7 to 15 times the weight of the lithium phosphate is added to the lithium phosphate, an acid including $H_3PO_4$, $H_2CO_3$, $H_2SO_4$, $HNO_3$, or HCl or an aqueous solution of the acid is added, so that a lithium phosphate aged solution of which pH is in a range of 9 to 11 is produced. The lithium phosphate aged solution is stirred at the room temperature for 30 minutes or more to age the lithium phosphate.

According to another embodiment of the invention, the acid or the aqueous solution of the acid is 10% aqueous solution of phosphoric acid having a concentration of 0.2 times the weight of the lithium phosphate.

According to another embodiment of the invention, the concentration of the lithium in the lithium phosphate aged solution is 200 mg/kg.

The lithium phosphate aged solution is added with an aqueous solution of lithium hydroxide to produce the lithium phosphate precipitated solution, and reaction is performed at a high temperature to precipitate the high-purity lithium phosphate. The aqueous solution of lithium hydroxide added to the lithium phosphate aged solution is additionally added in order to assist the precipitation of the lithium phosphate from the reaction of the lithium phosphate precipitated solution.

According to the embodiment, in the stirred lithium phosphate aged solution added with the aqueous solution of lithium hydroxide, the concentration of the lithium hydroxide is a molar equivalent of the acid added to the lithium phosphate aged solution.

According to another specific embodiment, the aqueous solution of lithium hydroxide contains 5 to 30 wt % of lithium hydroxide. Preferably, the aqueous solution of lithium hydroxide contains lithium hydroxide having a concentration of 7 to 15 wt %.

According to another embodiment of the invention, the pH of the lithium phosphate precipitated solution is in a range of 11.5 to 13.5. Preferably, the pH of the lithium phosphate precipitated solution is 12.5.

According to another embodiment of the invention, the produced lithium phosphate precipitated solution is stirred in a temperature range of 50 to 100° C. for 20 minutes or more to precipitate the high-purity lithium phosphate. Preferably, the produced lithium phosphate precipitated solution is stirred in a temperature range of 70 to 95° C. for 80 minutes to precipitate the high-purity lithium phosphate.

Since the precipitation process is a process of recrystallization of the high-purity lithium phosphate, there is an advantage in that the size of the lithium phosphate crystal is larger than the size of the lithium phosphate crystal obtained from the lithium phosphate manufacturing steps. The additionally added hydroxyl group functions as assisting the crystallization of the lithium phosphate. The pH, reaction temperature, and time appropriate for the precipitation of the lithium phosphate are described above in the description of the steps of reacting the mixed solution of sodium phosphate and lithium waste liquid, and thus, the description thereof is omitted for simplifying the description.

According to specific embodiments, a second solid liquid separation is performed on the lithium phosphate precipitated solution from which the high-purity lithium phosphate is precipitated, so that only the high-purity lithium phosphate is separated.

[Step of Cleaning and Drying of High-Purity Lithium Phosphate]

Cleaning and drying are performed on the separated high-purity lithium phosphate. A small amount of the sodium and sulfate ion may remain as impurities on the surfaces of the high-purity lithium phosphate. Therefore, the impurities are removed through the cleaning and drying processes.

According to the embodiment, in the cleaning, first, the high-purity lithium phosphate is immersed into distilled water so that 30 to 40% of moisture is allowed to be contained. Next, in the dehydration drying, centrifugal dehydration is performed so that only 15 to 20% of moisture remains.

According to another specific embodiment, the cleaning and dehydration processes are repeated three times or more.

According to another embodiment of the invention, the high-purity lithium phosphate generated in the invention exist in a form of primary crystal particles, the size of the primary crystal particle is in a range of 10 to 15 μm, the content of the sodium is 50 mg/kg or less, and the content of the sulfate ion is 100 mg/kg or less.

[Waste Water Treatment Process]

According to a specific embodiment of the invention, a large amount of the phosphate ions ($PO_4^{3-}$) exist in the filtrated liquid (waste liquid) obtained in step (c). In order to discharge the filtrated liquid, the phosphate as a main factor of eutrophication of river needs to be removed. In the invention, additionally provided is the waste water treatment process together with the lithium phosphate manufacturing process.

According to the embodiment, the filtrated liquid obtained through the first solid liquid separation of step (c) is added with 1 to 1.5 wt % of 10% calcium hydroxide ($Ca(OH)_2$) slurry, and stirring is performed for 20 to 40 minutes. Preferably, the filtrated liquid obtained through the first solid liquid separation of step (c) is added with 1 t wt % of 10% calcium hydroxide ($Ca(OH)_2$) slurry, and stirring is performed for 30 minutes.

According to another specific embodiment, the pH-adjusted filtrated liquid is added with 0.01 to 0.02 wt % of 10% aluminum sulfate ($Al_2(SO_4)_3$) solution, and stirring is performed for 20 to 40 minutes. Preferably, the pH-adjusted filtrated liquid is added with 0.015 wt % of 10% aluminum sulfate ($Al_2(SO_4)_3$) solution, and stirring is performed for 20 to 40 minutes.

According to still another embodiment of the invention, the concentration of the phosphorus in the filtrated liquid finally manufacture through the waste water treatment process is 2 ppm or less. Therefore, the filtrated liquid is so clean that the filtrated liquid can be immediately discharged into a river.

EXAMPLE

1. Manufacturing of High-Purity Lithium Phosphate

1) Process of Removing Organic Materials 1 to of a lithium waste liquid generated in a process of recovering cobalt and nickel in recycling a wasted battery was used. The pH of the lithium waste liquid was observed to be in a range of 5 to 7, and lithium (Li), sodium (Na), sulfate ions ($SO_4^{2-}$), and organic materials were contained in the lithium waste liquid. The average composition of main components contained in the lithium waste liquid is listed in Table 1. In order to remove the organic materials contained in the lithium waste liquid, active carbon was used. The lithium waste liquid was allowed to pass through an active carbon adsorption tower to remove the organic materials.

TABLE 1

| Composition (total 1000 kg of a lithium waste liquid) | Concentration |
| --- | --- |
| lithium ions ($Li^+$) | 2990 ppm |
| sodium ions ($Na^+$) | 12030 ppm |
| sulfate ions ($SO_4^{2-}$) | 50500 ppm |
| organic materials | 130 ppm |

2) Producing of Lithium Phosphate ($Li_3PO_4$)

In order to recover lithium from the lithium waste liquid from which the organic materials were removed through the active carbon adsorption, a method of reacting the lithium existing in the lithium waste liquid with a phosphoric acid to precipitate lithium phosphate ($Li_3PO_4$) was used. The lithium waste liquid was added with sodium phosphate ($Na_3PO_4$). In order to stably react the phosphoric acid with the lithium so that a maximum of the lithium can be converted into the lithium phosphate, the added amount of sodium phosphate was 1.1 molar equivalents with respect to the concentration of the lithium existing in 1 ton of the lithium waste liquid from which the organic materials are removed. More specifically, 1 ton of the lithium waste liquid was added with 238.6 kg of aqueous solution obtained by dissolving 23.63 kg of sodium phosphate and 2.3 kg of sodium hydroxide (NaOH) in 212.67 kg of water. After the lithium waste liquid was added with the aqueous solution of sodium phosphate, reaction was performed at various temperatures for various time intervals. As a reaction condition, a temperature of 20° C. for 72 hours, a temperature of 30° C. for 1 hour, a temperature of 40° C. for 1 hours, a temperature of 50° C. for 1 hours, a temperature of 70° C. for 1 hours, and a temperature of 90° C. for 1 hours were set. The pH of the lithium waste liquid added with the sodium phosphate, the water, and the sodium hydroxide was observed to be 13.5. If the lithium phosphate reaction is performed, the phosphoric acid is combined with the lithium, the lithium phosphate is precipitated. Therefore, if solid liquid separation is performed on the lithium waste liquid which is subject to the lithium phosphate generation reaction, solid and liquid contained in the lithium phosphate can be separated. In order to separate the lithium phosphate precipitated in the reaction, the solid liquid separation (first solid liquid separation) was performed. As a result of the solid liquid separation, it was observed that the lithium phosphate ($Li_3PO_4$) and a small amount of the sodium sulfate ($Na_2SO_4$) exist in the separated solid, and it was observed that lithium ions ($Li^+$), phosphate ions ($PO_4^{3-}$), sodium ions ($Na^+$), sulfate ions ($SO_4^{2-}$) exist in the separated liquid. The result of component analysis of the solid and the liquid obtained from the solid liquid separation performed after the lithium phosphate generation reaction process is listed in Table 2.

TABLE 2

| | Solid Liquid Separation after Lithium Phosphate Generation Reaction Process | |
| --- | --- | --- |
| Composition | Solid State (Total 20.3 kg) | Liquid State |
| lithium (Li) | 17.9 wt %, Solid State | 70 ppm |
| sodium (Na) | 495 ppm | 12030 ppm |
| sulfate ions ($SO_4$) | 992 ppm | 50500 ppm |
| phosphate ions ($PO_4$) | 82.0 wt %, Solid State | 950 ppm |

Therefore, the amount of the lithium phosphate produced through the lithium phosphate generation reaction and the solid liquid separation was total 20.3 kg. The content of the moisture in the obtained lithium phosphate was 20%.

3) Process of Refining Lithium Phosphate ($Li_3PO_4$)

As listed in Table 2, the solid-state lithium phosphate separated through the solid liquid separation contained 20% of moisture, and the moisture contained 495 ppm of sodium and 992 ppm of sulfate ions. In the invention, in order to manufacture the high-purity lithium phosphate by removing the sodium and the sulfate ions existing in the h lithium phosphate, a refining process was performed. The lithium phosphate refining process was configured with two steps. The first step of the lithium phosphate refining process is a lithium phosphate aging step where the lithium phosphate precipitated in the lithium phosphate producing process was stirred in an environment that the solubility of the lithium phosphate was heightened, so that rearrangement of the lithium ions and the phosphate ions as constituent ions of the lithium phosphate was facilitated. Therefore, the lithium phosphate obtained through a filtering process after the lithium phosphate generation reaction was added with an aqueous solution of phosphoric acid (230 g of 85% phosphoric acid+212.67 kg of water) and stirred at a room temperature for 30 minutes. If the phosphoric acid is used to dissolve the lithium phosphate, there is an advantage in that the pH of the solution can be adjusted without secondary contamination while the lithium phosphate can be well dissolved. It was observed that, as a result of the addition of the phosphoric acid, the pH of the lithium phosphate solution was adjusted to be 10.0.

The second step of the lithium phosphate refining process is a lithium phosphate precipitation step where the dissolved lithium phosphate is precipitated again and the size of the precipitated lithium phosphate crystal is increased as a crystal growing process. In order to perform the lithium phosphate precipitation step, the temperature of the lithium phosphate solution is increased up to 80° C., and 1.676 kg of 10% aqueous solution of lithium hydroxide (167.6 g of lithium hydroxide+1508.4 g of water) was added, and stirring was performed for 2 hours. If the lithium hydroxide is used to precipitate the lithium phosphate, there is an advantage in that the pH of the solution can be adjusted without secondary contamination while the lithium phosphate can be well dissolved. It was observed that, as a result of the addition of the lithium hydroxide to the lithium phosphate solution, the pH of the lithium phosphate solution was adjusted to be 12.5, and it was observed that the lithium phosphate was precipitated and grown as a crystal.

The solid and liquid was separated by performing the solid liquid separation on the lithium phosphate solution added with the lithium hydroxide. The purity-improved lithium phosphate was obtained by performing cleaning and drying the separated solid. The cleaning was performed by a method of immersing the separated solid into distilled water so as to absorb 30 to 40% moisture and performing centrifugal dehydration at 1000 rpm so that the content of moisture was in a range of 15 to 20%. The method was repeated three times. In order to check how many impurities were contained in the obtained lithium phosphate, inductively coupled plasma atomic emission spectroscopy was performed to analyze constituents of the purity-improved lithium phosphate. It was observed through the inductively coupled plasma atomic emission spectroscopy that a small amount of the sodium and sulfuric acid were contained. By the refining process, about 15 kg of the lithium phosphate was obtained. Comparison of the amount of the sodium and sulfuric acid as impurities contained in the lithium waste liquid as a source material of the lithium phosphate, the unrefined lithium phosphate, and the refined lithium phosphate is listed in Table 3. As listed in Table 3, it was observed that the amount of the sodium and sulfuric acid existing in the refined lithium phosphate was remarkably decreased in comparison with the amount of the sodium and sulfuric acid contained in the lithium waste liquid as a source material. It was observed that the concentration of the sodium existing in the lithium phosphate was merely about 1/236 times the concentration of the sodium of the lithium waste liquid. In addition, it was observed that the concentration of the sulfuric acid existing in the lithium phosphate was merely about 1/515 times the concentration of the sulfuric acid of the lithium waste liquid. In addition, it was observed that the amount of the sodium and sulfuric acid existing in the refined lithium phosphate was remarkably decreased in comparison with the amount of the sodium and sulfuric acid existing in the unrefined lithium phosphate. It was observed that the concentration of the sodium and sulfuric acid existing in the refined lithium phosphate was merely about 1/8 time the concentration of the sodium and sulfuric acid existing in the unrefined lithium phosphate.

TABLE 3

| impurities | Concentration of Impurities | | |
|---|---|---|---|
| | a lithium waste liquid (1000 kg) | Unrefined lithium phosphate (20.3 kg) | Refined lithium phosphate (15 kg) |
| sodium (Na) | 12030 ppm | 495 ppm (24.4 ppm/kg) | 51 ppm (3.4 ppm/kg) |
| sulfuric acid ($SO_4$) | 50500 ppm | 992 ppm (48.9 ppm/kg) | 98 ppm (6.6 ppm/kg) |

Lithium ions exist in the filtrated liquid separated through the solid liquid separation process. The lithium ions may be generated in the lithium phosphate dissolving process due to the addition of the phosphoric acid. It was observed from the measurement of the concentration of the lithium of the separated filtrated liquid that the lithium ions having a concentration of 100 to 300 ppm existed. In the invention, the filtrated liquid is inserted in the lithium phosphate manufacturing process to recover the lithium ions, so that the manufacturing yield of the lithium phosphate can be improved. As a result, according to the lithium phosphate manufacturing process of the invention, 15 kg of high-purity lithium phosphate was able to be manufactured from 1000 kg of the lithium waste liquid.

Figure 2:
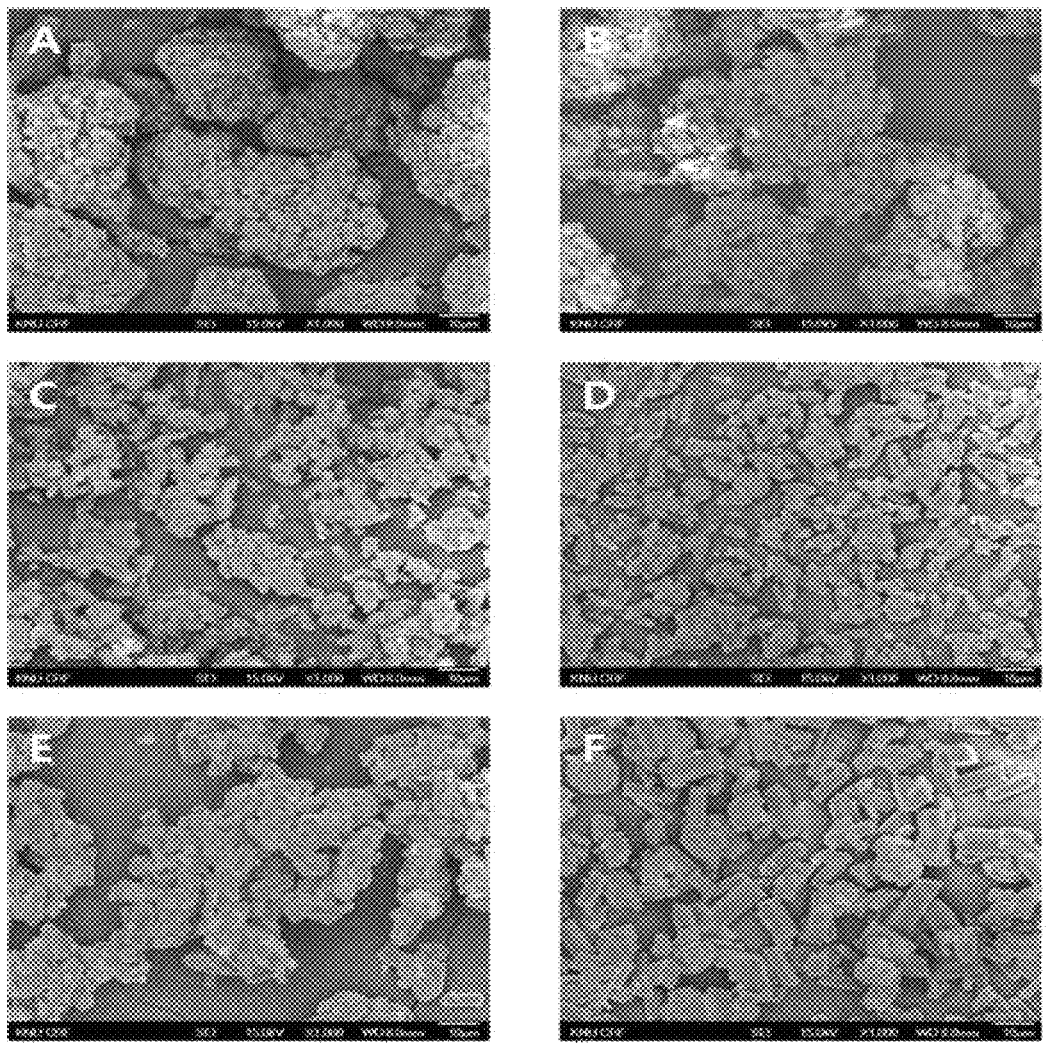
FIG. 2 illustrates electron microscope images of lithium phosphate crystals according to reaction conditions, a panel A illustrating lithium phosphate crystals generated by reacting a mixed solution of sodium phosphate and lithium waste liquid at a temperature of 20° C. for 72 hours, a panel B illustrating lithium phosphate crystals generated by reacting a mixed solution of sodium phosphate and lithium waste liquid at a temperature of 30° C. for 1 hour, a panel C illustrating lithium phosphate crystals generated by reacting a mixed solution of sodium phosphate and lithium waste liquid at a temperature of 40° C. for 1 hour, a panel D illustrating lithium phosphate crystals generated by reacting a mixed solution of sodium phosphate and lithium waste liquid at a temperature of 50° C. for 1 hour, a panel E illustrating lithium phosphate crystals generated by reacting a mixed solution of sodium phosphate and lithium waste liquid at a temperature of 70° C. for 1 hour, and a panel F illustrating lithium phosphate crystals generated by reacting a mixed solution of sodium phosphate and lithium waste liquid at a temperature of 90° C. for 1 hour.

2. Analysis of Characteristics of Lithium Phosphate Crystal Through Electron Microscope In the lithium phosphate manufacturing process, the lithium phosphate crystals were manufactured in reaction conditions of 20° C. for 72 hours (panel A of FIG. 2), 30° C. for 1 hour (panel B of FIG. 2), 40° C. for 1 hour (panel C of FIG. 2), 50° C. for 1 hour (panel D of FIG. 2), 70° C. for 1 hour (panel E of FIG. 2), and 90° C. for 1 hour (panel F of FIG. 2), and refining was performed. Election microscope analysis was performed on the refined lithium phosphate crystals (panels A to F of FIG. 2).

Figure 3:
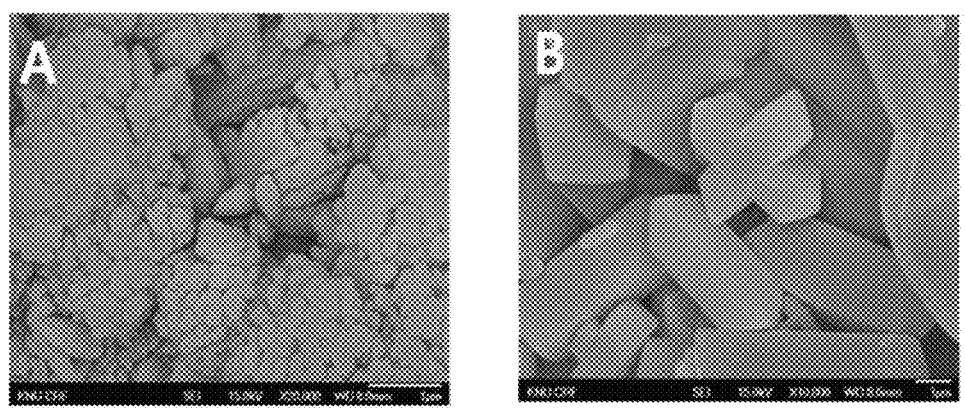
FIG. 3 illustrates enlarged electron microscope images of the lithium phosphate crystals, a panel A illustrates an enlarged electron microscope image of lithium phosphate crystals generated by reacting a mixed solution of sodium phosphate and lithium waste liquid at a temperature of 20° C. for 72 hours, and a panel B illustrates an enlarged electron microscope image of lithium phosphate crystals generated by reacting a mixed solution of sodium phosphate and lithium waste liquid at a temperature of 90° C. for 1 hour.

It was observed from the result of the analysis that, as the reaction temperature was increased, the number of large-sized primary particles (crystals) was increased. With respect to the lithium phosphate crystal manufactured at 20° C., it was observed that ultrafine-sized primary particles having a size of 0.01 μm or less were agglomerated to constitute fine-sized secondary particles having a size of 0.1 to 0.5 μm, and these particles were agglomerated to constitute tertiary particles (panel A of FIG. 2). Next, the reaction temperature was increased to 30° C., 40° C., and 50° C., and the above process was performed. As a result, it was observed that the size of the lithium phosphate particles was gradually increased, and it was observed that, as the size of the particles was increased, the agglomeration of the lithium phosphate particles was decreased (panels B, C, and D of FIG. 2). Next, the reaction temperature was increased to 70° C., and the lithium phosphate was manufactured. As a result, it was observed that a large number of primary lithium phosphate crystals having a size of 10 μm were generated (panel E of FIG. 2). Next, the reaction temperature was increased to 90° C., and the lithium phosphate was manufactured. As a result, it was observed that most of the lithium phosphate crystals were primary particles having a size of 10 to 15 μm (panel F of FIG. 2). By enlarging the electron microscope images of the lithium phosphate crystals manufactured at 20° C. and the lithium phosphate crystals manufactured at 90° C. among the electron microscope images of the lithium phosphate crystals, the surfaces of the lithium phosphate crystals were observed. From the observation of the surfaces of the lithium phosphate crystal generated from the reaction at a temperature of 20° C. for 72 hours through the enlarged electron microscope image, it was found that fine-sized particles were agglomerated and there were very many voids between the particles (panel A of FIG. 3). On the contrary, it was found that the surfaces of the lithium phosphate crystal generated from the reaction at a temperature of 90° C. for 1 our were smooth and there was no agglomeration of the primary particles (panel B of FIG. 3). As a result, in the crystals having a fine structure such as the lithium phosphate crystals manufactured at 20° C., there is a high possibility that impurities such as sodium or sulfate ions are adsorbed to voids between the particles or surfaces of the particles. In addition, since the adsorbed impurities are hard to remove through cleaning, the adsorption of impurities is a factor of deterioration in purity of the lithium phosphate. However, like the lithium phosphate crystals manufactured at 90° C., the lithium phosphate crystals having a large particle size, existing in a form of primary particles, and having a smooth surface has a small specific surface area, and thus, impurities such as sodium or sulfate ions are hard to be adsorbed, so that there is an advantage in that it is possible to obtain high-purity crystals.

3. Waste Water Treatment Process for Discharging Waste Water

In the lithium phosphate manufacturing process, the filtrated liquid separated through the solid liquid separation after the lithium phosphate manufacturing reaction contains highly-concentrated phosphate ions as listed in Table 4.

TABLE 4

| Materials Contained in filtrated liquid (1000 kg) | Concentration |
|---|---|
| lithium (Li) | 70 ppm |
| phosphate ions ($PO_4^{3-}$) | 950 ppm |
| sodium ions ($Na^+$) | 12000 ppm |
| sulfate ions ($SO_4^{2-}$) | 50000 ppm |

In order to discharge the filtrated liquid as purified waste water, the concentration of the contamination source materials existing in the filtrated liquid needs to be reduced down to a discharge reference value or less. Particularly, since the phosphorus components ($PO_4^{3-}$□and the like) are one of main factors of eutrophication of river, the amount of the phosphorus components which is allowed to be discharged to river is strictly restricted. Therefore, in order to discharge the filtrated liquid as purified waste water, the concentration of the phosphorus in the filtrated liquid needs to be reduced down to a reference value or less that the phosphorus is allowed to be discharged. For this reason, in the invention, the phosphorus was removed by using calcium hydroxide ($Ca(OH)_2$), carbon dioxide ($CO_2$), and aluminum sulfate ($Al_2(SO_4)_3$). 11.9 kg of 10% calcium hydroxide slurry (1.18 kg of calcium hydroxide+10.62 kg of water) was added to the filtrated liquid, and stirring was performed for 30 minutes. After that, by addition the carbon dioxide, the pH of the filtrated liquid was adjusted to be 6.0. After the addition of the carbon dioxide, 120 g of 10% aqueous solution of aluminum sulfate was added, and stirring was further performed for 30 minutes. The solid liquid separation was performed on the stirred filtrated liquid to separate the sludge and the filtrated liquid. It was observed that the sludge contained refractory phosphates of which the content of the moisture was 25%. It was observed that the concentration of the phosphorus existing in the filtrated liquid was 2 ppm or less. Since the filtrated liquid contains phosphorus having a low concentration, the filtrated liquid is so clean that the filtrated liquid can be immediately discharged.

While the present invention has been particularly shown and described with reference to exemplary embodiments thereof, it will be understood by those skilled in the art that various changes and modifications in form and details may be made therein without departing from the spirit and scope of the present invention as defined by the appended claims

What is claimed is:

1. A method of manufacturing high-purity lithium phosphate by using a lithium waste liquid of a wasted battery, comprising steps of:
   (a) passing the lithium waste liquid through active carbon to remove organic materials;
   (b) adding a soluble phosphate or an aqueous solution of the soluble phosphate with 0.9 to 1.2 molar equivalents with respect to a concentration of lithium existing in the lithium waste liquid to the lithium waste liquid from which the organic materials are removed and adding alkali or an aqueous solution of the alkali to produce a mixed solution of phosphate and lithium waste liquid of which pH is in a range of 13 to 13.9;
   (c) reacting the mixed solution of phosphate and lithium waste liquid in a temperature range of 50 to 100° C. for 30 to 120 minutes, and after that, performing first solid liquid separation to produce lithium phosphate which is precipitated in a solid state;
   (d) adding water of which weight is 5 to 20 times the weight of the lithium phosphate to the produced lithium phosphate and adding an acid or an aqueous solution of the acid to produce a lithium phosphate aged solution of which pH is in a range of 7 to 11 and stirring the lithium phosphate aged solution at the room temperature for 30 minutes or more to age the lithium phosphate;
   (e) adding an aqueous solution of lithium hydroxide with a molar equivalent of the added amount of the acid to the stirred lithium phosphate aged solution to produce a lithium phosphate precipitated solution of which pH is in a range of 11.5 to 13.5 and stirring the lithium phosphate precipitated solution in a temperature range of 50 to 100° C. for 20 minutes or more to precipitate high-purity lithium phosphate; and
   (f) cleaning and drying the separated high-purity lithium phosphate.

2. The method according to claim 1, wherein the pH of the lithium waste liquid of the wasted battery is in a range of 5 to 7, and the lithium waste liquid contains lithium ions having a concentration of 300 to 3,000 mg/kg, sodium ions having a concentration of 10,000 to 50,000 mg/kg, and sulfate ions having a concentration of 10,000 to 100,000 mg/kg.

3. The method according to claim 1, wherein the aqueous solution of the soluble phosphate contains the soluble phosphate having a concentration of 5 to 30 wt %, and the pH of the aqueous solution of the soluble phosphate is in a range of 13 to 13.9.

4. The method according to claim 1, wherein the mixed solution of phosphate and lithium waste liquid contains phosphoric acid having a concentration of 0.9 to 1.2 molar equivalents of lithium concentration and hydroxyl group having a concentration of 0.01 to 1 N.

5. The method according to claim 1, wherein the lithium phosphate aged solution contains lithium having a concentration of 200 mg/kg or more.

6. The method according to claim 1, wherein the aqueous solution of lithium hydroxide contains lithium hydroxide having a concentration of 5 to 30 wt %.

7. The method according to claim 1, wherein the step of cleaning and drying of the high-purity lithium phosphate is performed by immersing into distilled water so that the lithium phosphate precipitated in the step (e) contains 30 to 40% of moisture and by performing centrifugal dehydration so that the lithium phosphate contains 15 to 20% of moisture.

8. The method according to claim 1, comprising a step of additionally performing a waste water treatment process on a filtrated liquid obtained through the first solid liquid separation.

9. The method according to claim 8, wherein the waste water treatment process includes:
(g) adding calcium hydroxide ($Ca(OH)_2$) having a concentration of 1 to 1.5 wt % in a 10% slurry state to the filtrated liquid obtained through the first solid liquid separation of claim 1 to stirring for 20 to 40 minutes;
(h) adding carbon dioxide ($CO_2$) to the stirred filtrated liquid to adjust the pH to be in a range of 5.5 to 6.5;
(i) adding 10% aluminum sulfate ($Al_2(SO_4)_3$) solution having a concentration of 0.01 to 0.02 wt % to the pH-adjusted filtrated liquid and stirring for 20 to 40 minute; and
(j) performing third solid liquid separation on the stirred filtrated liquid to separate sludge containing a refractory phosphate and the filtrated liquid.

10. The method according to claim 1, wherein the high-purity lithium phosphate exists in a form of primary crystal particles, a size of the primary crystal particle is in a range of 5 to 20 μm, a content of sodium is 50 mg/kg or less, and a content of sulfuric acid is 100 mg/kg or less.

* * * * *